United States Patent Office 2,994,191
Patented Aug. 1, 1961

2,994,191
OPERATION OF REACTION MOTORS
Bob R. Hamilton, Bartlesville, Okla., assignor to Phillips Petroleum Company, a corporation of Delaware
No Drawing. Filed Sept. 24, 1956, Ser. No. 611,783
9 Claims. (Cl. 60—35.4)

This invention relates to an improved method of operating a fluid bipropellant reaction motor.

The propelling action of a rocket motor is derived from the generation of large quantities of gases by the chemical reaction of suitable propellants within the rocket motor. The propellants employed in a rocket motor may be a solid or a liquid monopropellant (materials containing an adequate supply of available oxygen in their chemical composition), or two liquids (fuel plus oxidizer).

The principal elements of a bipropellant liquid-rocket engine are a combustion chamber, exhaust nozzle, propellant injection system, fuel tank, oxidant tank, and control valves. The fuel and oxidant react in the combustion chamber to form high temperature gases at pressures governed by the nozzle throat area, rate of propellant injection, ratio of fuel to oxidant, and the efficiency of conversion. Combustion temperature and thus pressure are also functions of the fuel and oxidant used. These high temperature gases are accelerated by a nozzle to a very high velocity (usually in excess of 4000 ft./sec.). The reaction force resultant to this gas acceleration provides thrust to drive the rocket.

The injection system through which the liquid propellants (fuel and oxidant) flow into the combustion chamber is usually designed to mix the propellants as they enter. The reaction of the fuel and oxidant may be enhanced by atomization by pressure drop through the nozzle or by impingement of the fuel and oxidant streams, or it may be desirable to prevent substantial atomization depending on the engine and propellant system used. To start the operation of the rocket motor, an electric igniter is necessary with some propellants, but propellants which ignite spontaneously on contact with each other are frequently employed and are sometimes preferred. These propellant fuels which ignite spontaneously on contact with the oxidizer are called hypergolic fuels. It is desirable in the interest of safety to personnel and equipment that the fuel ignite as soon as possible upon contact in order to prevent the build up of excess fuel in the combustion chamber prior to ignition.

It is generally recognized that the starting characteristics of liquid propellant rockets are affected by the ignition delay of the propellant systems employed. The actual mechanism of the ignition of spontaneous liquid propellants is difficult to determine. In the case of actual motor operations, the conditions are complicated by physical factors such as injection pressures, mixing parameters, chamber dimensions, and other factors which may mask the purely chemical factors involved. The chemical factors involved in ignition with propellant systems employing nitric acid as the oxidizer may be broken down as follows: neutralization reactions, nitration reactions, and oxidation reactions. These reactions may occur singly or simultaneously in either the vapor or the liquid phase. In any event, ignition delay should be as low as possible and any lowering of this characteristic of a fuel and oxidant is highly desirable.

Accordingly, it is an object of the invention to provide an improved method of operating a bipropellant rocket motor. Another object is to provide a method of operating a rocket motor with reduced ignition delay. A further object is to provide a modified nitric acid oxidizer for effecting more nearly instantaneous ignition of hypergolic fuels. It is also an object of the invention to provide a modified nitric acid oxidizer which renders certain non-hypergolic fuels hypergolic. Other objects of the invention will become apparent from a consideration of the accompanying disclosure.

I have discovered a method of reducing ignition delay in the oxidation of hypergolic rocket fuels which utilizes $CrO_3$ as a catalyst or ignition accelerator. I have also found that the incorporation of $CrO_3$ in fuming nitric acid imparts hypergolicity to certain non-hypergolic fuels when the stream of fuel and oxidizer are brought together in the combustion chamber of a reaction motor.

Chromium trioxide is effective in reducing ignition delay of a fuel oxidized with white fuming nitric acid (WFNA) or red fuming nitric acid (RFNA). This agent is best added to the fuming nitric acid but may be separately introduced so that it is commingled with the fuel and nitric acid in the mixing zone of the combustion chamber of the motor; it is far simpler and more practical to merely incorporate the $CrO_3$ in the nitric acid before commingling the same with the fuel. The addition of the $CrO_3$ to the fuel is usually impractical and sometimes dangerous because of the capacity of this agent to effect ignition of some fuels, even in the absence of the nitric acid.

The optimum amount of the ignition accelerating agent ($CrO_3$) to use with any given fuel and nitric acid is readily determinable by routine tests; however, the amount will usually be in the range of 0.1 to 10 weight percent based on the weight of the nitric acid and is preferably in the range of 1 to 5 weight percent thereof.

$CrO_3$ as an ignition accelerating agent is effective with white fuming nitric acid containing from 1 to about 8 percent by weight of water, the balance being $HNO_3$, and red fuming nitric acid containing up to about 5 weight percent of water and from 1 to about 24 percent $NO_2$, the balance being $HNO_3$. The red fuming nitric acid used in the examples had the composition: 2% water, 21 percent $NO_2$, and 77% $HNO_3$.

There are many hypergolic fuels available. While the following list is not intended to be exhaustive it will illustrate the wide variety of materials which have the property of spontaneous combustion on being contacted with strong oxidizers such as fuming nitric acids. These materials include unsaturated hydrocarbons of the acetylene and diolefin series, for example, divinyl acetylene, dipropargyl, propargyl alcohol, 2-methyl-1,3-butadiene and dicyclopentadiene; nitrogen-containing petroleum derivatives, for example, diallylamine, 1,3-diaminobutane, 2-amino-5-diethylaminopentane, phenetidine, and pyrrole; sulfur-containing petroleum derivatives, for example, normal butyl mercaptan, divinyl sulfide and diallyl sulfide; petroleum derivatives containing both sulfur and nitrogen, for example, N-methylethylsulfenamide, 2-aminothiophenol and N-methyl-tertiary-butylsulfenamide; oxygen-containing petroleum derivatives, for example, 2-methoxybutadiene, geraniol, linalool, 2-methylfuran and furfuryl alcohol; combustible liquid slurries of elements such as potassium and sodium, for example, dispersions of sodium in ether; liquid hydrides of metals, for example, pentaborane ($B_5H_9$); liquid organometallic compounds such as aluminum triethyl; and liquid fuels containing sodium or potassium in suspension, for example, dispersions of sodium in gasoline.

Non-hypergolic fuels include the simple alcohols such as methanol, ethanol, butanol, etc., methylvinylpyridine, liquid petroleum derivatives, such as monopropellents, for example, nitromethane, etc.

Certain rocket fuels are more expensive than hydrocarbon fuels such as those of the JP–4 or JP–3 designation and it is current practice to include in the more expensive fuels as much of the cheaper hydrocarbon fuels as possible and still retain the hypergolicity of the more expensive fuels in the presence of nitric acid without too much increase in ignition delay. It has been found that inclusion of $CrO_3$ in nitric acid not only reduces the ignition delay of certain well known hypergolic fuels when contacted with nitric acid, but also permits the inclusion of considerably greater quantities and proportions of JP-4 and JP-3 jet fuels in the fuel mixture while still retaining sufficiently low ignition delay for operation in a rocket motor. Fuels which illustrate this feature of the invention comprise N,N,N',N'-tetramethylpropene-1,3-diamine, N,N,N',N'-tetramethylethane-1,2-diamine, and N,N,N',N'-tetramethylbutane-1,3-diamine.

In the following example the drop test method for evaluating hypergolic fuels was used. The drop test apparatus comprises an injection nozzle controlled by a solenoid-operated pintle valve which injects the oxidizer into a small quantity of fuel contained in the bottom of a test tube. The ignition delay is determined as the time interval between contact of the oxidizer and fuel and the presence of flame as sensed by a photocell.

EXAMPLE

Ignition delays of several fuels were measured first with RFNA and then with RFNA containing two grams of $CrO_3$ in 50 cc. RFNA. The data are presented in the table below:

Table

| Fuel | JP-4 Dilution, Percent [a] | Ignition Delay, Millisecs. | |
|---|---|---|---|
| | | RFNA | RFNA +$CrO_3$ |
| Hydrazine | 0 | 2.2 | 3.7 |
| N,N,N',N'-tetramethylpropene-1,3-diamine | 0 | 12.2 | 5.4 |
| Do | 40 | 149.5 | 12.8 |
| Do | 50 | [b] N.I. | 16.7 |
| Do | 60 | | 22.7 |
| Do | 70 | | 19.0 |
| Do | 80 | | [b] N.I. |
| N,N,N',N'-tetramethylethane-1,2-diamine | 50 | 81.4 | 62.2 |

[a] Percent JP-4 in the total fuel mixture.
[b] No ignition.

Upon examination of the data in the table it may be seen that the addition of $CrO_3$ to RFNA did not affect the ignition delay of hydrazine, the difference being within experimental error. The effect when the fuel was N,N,N',N'-tetramethylpropene-1,3-diamine, both neat and diluted, was considerable; in fact, substantially instantaneous ignition was obtained at dilutions as high as 70 percent, while ignition was not obtained at 50 percent dilution when chromium trioxide was not present. With N,N,N',N'-tetramethylethane-1,2-diamine at 50 percent dilution with JP-4 the decrease in ignition delay was substantial.

Certain modifications of the invention will become apparent to those skilled in the art and the illustrative details disclosed are not to be construed as imposing unnecessary limitations on the invention.

I claim:
1. A method of operating a bipropellant liquid reaction motor which comprises bringing together in a combustion zone of said motor fuming nitric acid containing dissolved $CrO_3$ in the range of 0.1 to 10 weight percent of said acid and a fuel hypergolic in contact with $CrO_3$ and nitric acid selected from the group consisting of divinyl acetylene, dipropargly, propargyl alcohol, 2-methyl-1,3-butadiene, dicyclopentadiene, diallylamine, 1,3-diaminobutane, 2-amino-5-diethylaminopentane, phenetidine, pyrrole, normal butyl mercaptan, divinyl sulfide, diallyl sulfide, N-methylethylsulfenamide, 2-aminothiophenol, N-methyl-tertiary-butylsulfenamide, 2-methoxybutadiene, geraniol, linalool, 2-methylfuran, furfuryl alcohol, pentaborane, aluminum triethyl, methylvinylpyridine, nitromethane, N,N,N',N'-tetramethylpropene-1,3-diamine, N,N,N',N'-tetramethylethane-1,2-diamine, N,N,N',N'-tetramethylbutane-1,3-diamine, sodium dispersed in ether, potassium dispersed in ether, sodium dispersed in gasoline, potassium dispersed in gasoline, and lower alkanols, the ratio of the combine $CrO_3$ and nitric acid to the fuel being such as to decrease the ignition delay period of the fuel.

2. The method of claim 1 wherein said fuel is hypergolic in contact with nitric acid alone.

3. The method of claim 1 wherein said fuel comprises N,N,N',N'-tetramethylpropene-1,3-diamine.

4. The method of claim 1 wherein said fuel comprises N,N,N',N'-tetramethylpropene-1,3-diamine and up to 70 weight percent of a liquid hydrocarbon fuel based upon the total mixture.

5. The method of claim 1 wherein said fuel comprises N,N,N',N'-tetramethylethane-1,2-diamine.

6. The method of claim 1 wherein said fuel comprises N,N,N',N'-tetramethylethane-1,2-diamine and up to 50 weight percent of a liquid hydrocarbon fuel based upon the total mixture.

7. The method of claim 1 wherein said fuel comprises N,N,N',N'-tetramethylbutene-1,3-diamine.

8. The method of claim 1 wherein said fuel comprises methylvinylpyridine.

9. The method of claim 1 wherein said fuel comprises methyl alcohol.

References Cited in the file of this patent

UNITED STATES PATENTS 2,433,943  Zwicky et al. _____ Jan. 6, 1948
2,573,471  Malina et al. _____ Oct. 30, 1951